March 24, 1970     L. D. BUTLER     3,502,229
BALE WAGON
Filed June 1, 1967     3 Sheets-Sheet 1
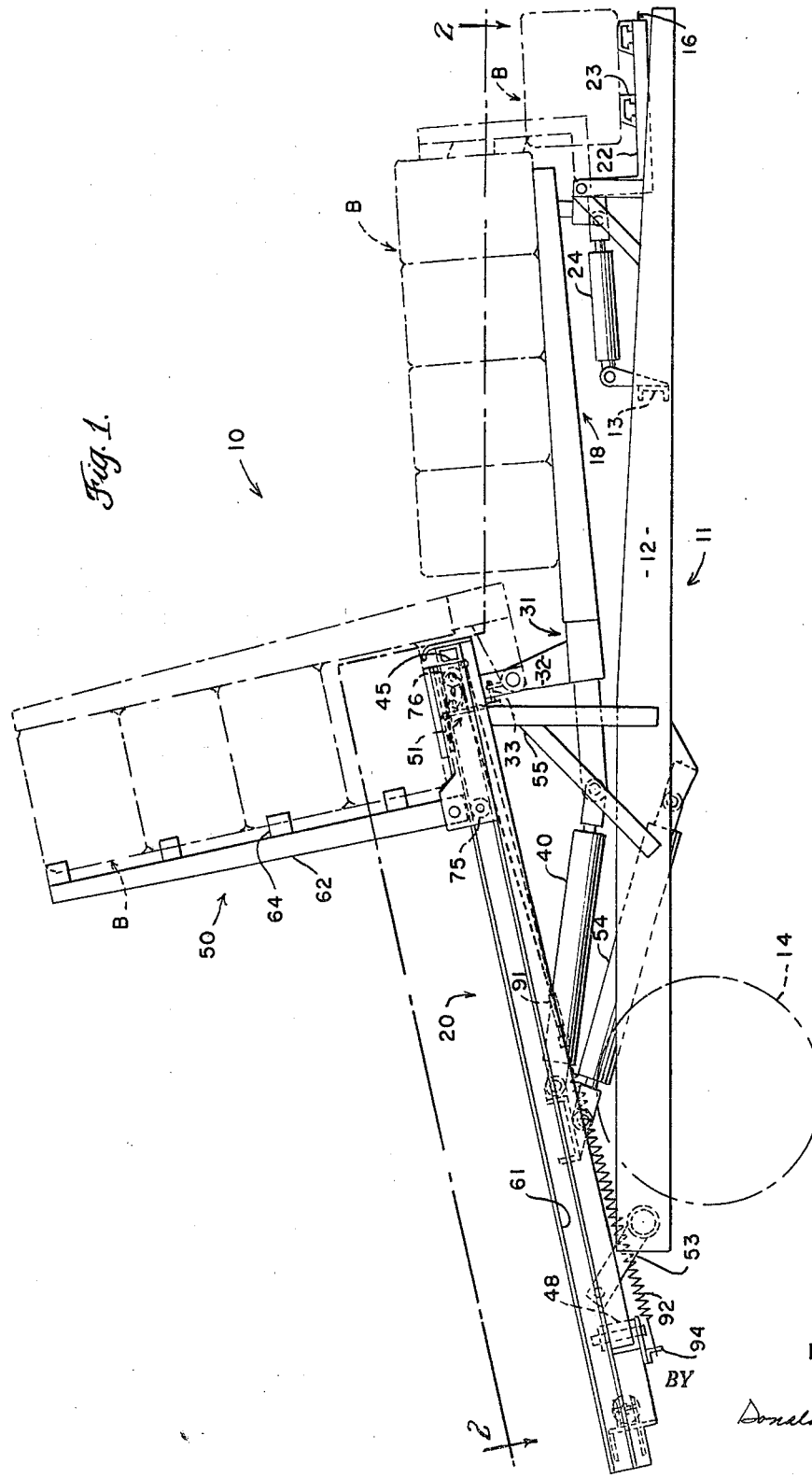
INVENTOR.
LEE D. BUTLER
BY Donald D. Schaper
ATTORNEY

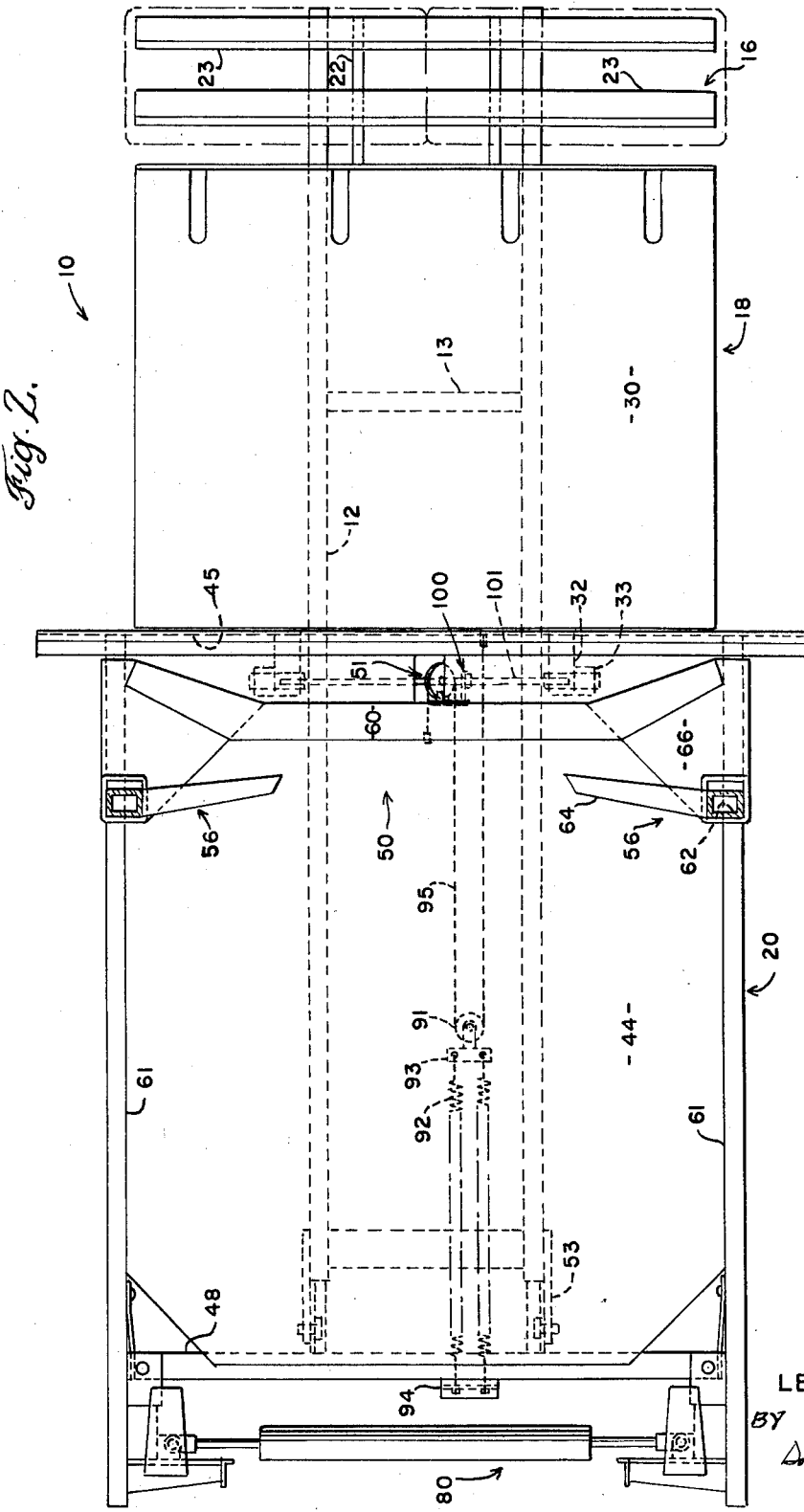

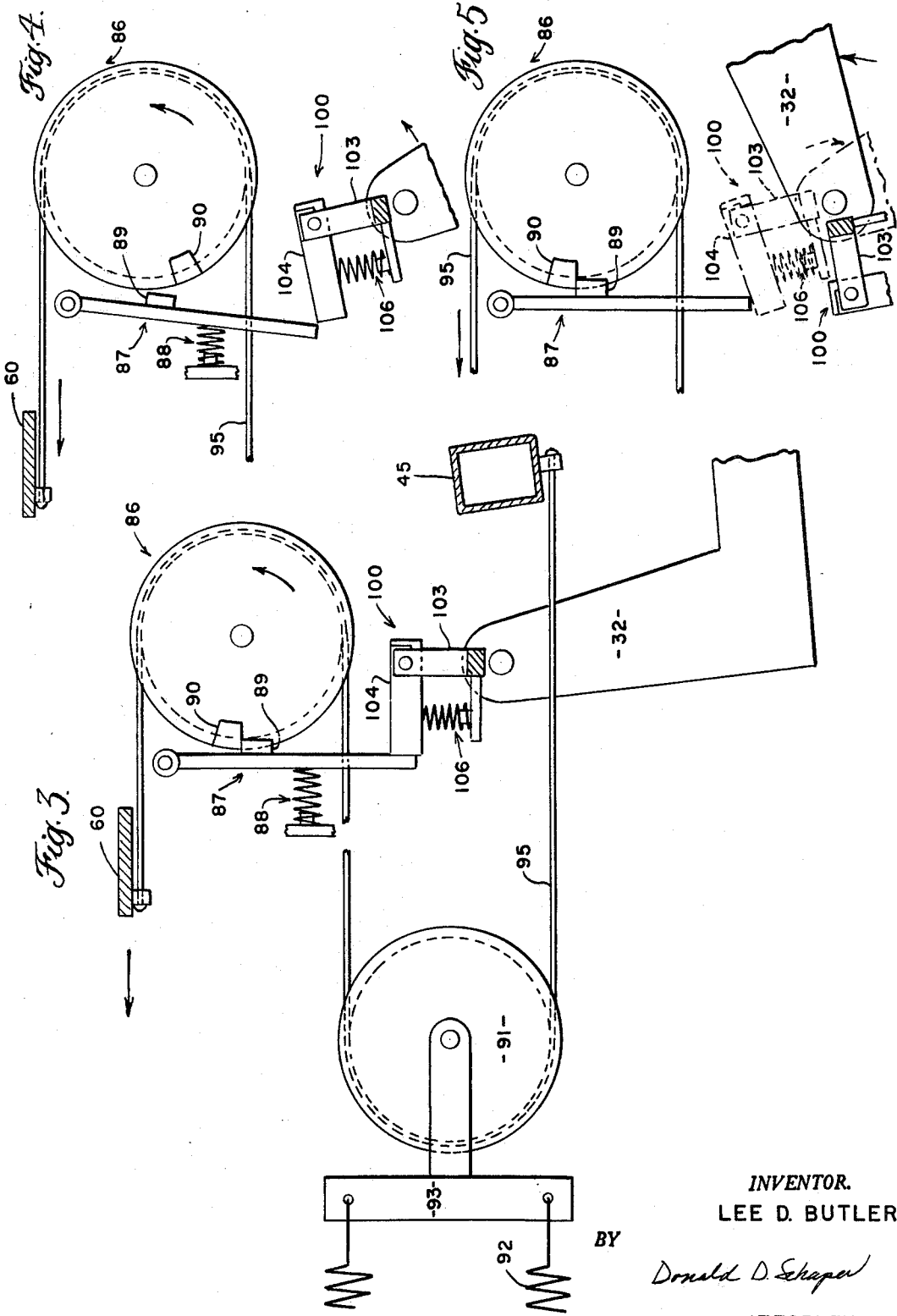

United States Patent Office 3,502,229
Patented Mar. 24, 1970

3,502,229
BALE WAGON
Lee Dennis Butler, Kingsburg, Calif., assignor to Sperry Rand Corporation, New Holland, Pa., a corporation of Delaware
Filed June 21, 1967, Ser. No. 647,811
Int. Cl. B65g 57/32, 57/24
U.S. Cl. 214—6　　　　　　　　　　　9 Claims

ABSTRACT OF THE DISCLOSURE

A bale wagon having a bale-retaining rack which is adapted to move longitudinally on a load-carrying bed and having a device for positively holding the rack in a series of positions along the load-carrying bed.

BACKGROUND OF THE INVENTION

This invention relates to bale wagons, and more specifically, to a device for vertically supporting bales on the wagon, as the wagon is being loaded.

In one known type of bale wagon, tiers of bales, four bales high and two bales across, are successively loaded onto the forward end of a load-carrying bed. As each tier is loaded, the bales on the wagon are moved rearwardly one bale width. A movable tine rack is used to support the rear end of the load as it is being accumulated on the bale wagon. Heretofore, the rack has been spring biased against the load; and as a new tier of bales was loaded onto the load-carrying bed, the rack and the load supported thereby would be moved rearwardly against the spring action. It has been found, that under some operating conditions, a more positive holding means for the rack is needed to provide for uniform rearward movement of the bales on the wagon.

SUMMARY OF THE INVENTION

Applicant's invention is directed to a locking device for holding a tine rack in a series of positions on the load-carrying bed. The locking device is adapted to be automatically disengaged when a tier of bales is being loaded on the load-carrying bed and to be automatically engaged when the tine rack has moved to a new position one bale width away from the previous position.

The movable tine rack is held in a given position by a locking device comprising a cable, or rope, having one end fixed to the rack and its other end fixed to the forward end of the load-carrying bed. From the rack, the cable extends forward to a pulley rotatably mounted on the load-carrying bed, then rearward to a movable sheave connected to the rear end of the load-carrying bed through a pair of springs, and then forward to the load-carrying bed.

Bales pressing against the rack cause movement of the rack whenever the cable connected to the rack is permitted to move rearwardly. The cable extends around the rotatably mounted pulley, and movement of the tine rack is controlled by controlling rotation of the pulley. A latch member, pivotally mounted adjacent the pulley, is spring baised into the path of a dog on the pulley. Rotation of the pulley is prevented when the latch member is in contact with the pulley. When a tier of bales is being placed on the load carrying bed by the transfer bed, a trip mechanism on the transfer bed momentarily disengages the latch member from the pulley, and the pulley moves through one revolution before it is again stopped by the latch member. The pulley is so dimensioned that its circumference is equal to one bale width, and thus, the rack is moved rearwardly a distance equal to one bale width each time a tier of bales is loaded.

A principal object of this invention is to provide a movable rack, in a bale wagon of the type described, which is adapted to be moved rearwardly one bale width when a tier of bales is placed on the load-carrying bed and to be positively held in this position until the next tier is loaded.

Another object of this invention is to provide a movable rack lock which is automatically disengaged each time a tier of bales is loaded onto the load-carrying bed and is automatically reset after the tier has been loaded.

A further object of this invention is to provide a rack lock which is unaffected by the amount of the load pressing against the rack.

A still further object of this invention is to provide a simple and efficient movable vertical support means for a load of bales on a bale wagon.

Other objects of this invention will be apparent hereinafter from the specification and from the recital in the appended claims.

BRIEF DESCRIPTION OF THE DRAWINGS

FIG. 1 is a side elevational view of a bale wagon, with the movable tine rack shown as it would appear after the first tier of bales has been delivered to the load-carrying bed. The bales and the transfer bed in its vertical position are indicated in dot-and-dash lines.

FIG. 2 is a plan view of FIG. 1, taken as indicated by the irregular line 2—2 in FIG. 1.

FIG. 3 is an enlarged view schematically illustrating the movable rack locking device and the bale wagon elements directly associated therewith. The latch member is shown in engagement with the pulley to prevent rotation thereof.

FIG. 4 illustrates the position of the latch member after being disengaged from the pulley by the trip mechanism on the transfer bed.

FIG. 5 shows a structural element of the transfer bed in full lines when the bed is in the vertical position and in dot-and-dash lines when the transfer bed is in an intermediate position in which the trip mechanism is passing under the latch member.

DESCRIPTION OF THE PREFERRED EMBODIMENT

Referring now to the drawings by numerals of reference and particularly to FIG. 1, the bale wagon selected to illustrate the invention is designated 10. Bale wagon 10 includes a chassis 11 comprised of longitudinal frame members 12 connected by suitable cross bars 13. Chassis 11 is supported adjacent its rear end by a pair of rear wheels 14, one of which is shown diagrammatically in FIG. 1. A receiving bed 16 is mounted on the forward end of chassis 11, a transfer bed 18 is mounted rearwardly of the receiving bed, and a load-carrying bed 20 extends from the transfer bed to the rear end of chassis 11. The forward end of chassis 11 is adapted to be connected to a towing vehicle, not shown. Bales B of hay, or other crop material, are loaded and stacked on wagon 10 in substantially the same manner as shown and described in the U.S. Patent to Grey No. 2,848,127, issued Aug. 19, 1958.

Receiving bed 16 comprises a pair of L-shaped elements 22 pivotally mounted on chassis 11, and a pair of transverse bars 23 carried on elements 22. A hydraulic cylinder 24 is provided to raise the receiving bed 16 from the solid line position shown in FIG. 1 to the dot-and-dash line position shown therein. A trip mechanism, not shown, on receiving bed 16 serves to actuate hydraulic cylinder 24 when two bales have been received and positioned on the bed.

Transfer bed 18 comprises a floor plate 30, and a pair of structural frame elements 31 having upstanding end portions 32 at their rear ends which are pivotally connected to brackets 33 on load-carrying bed 20. Transfer bed 18 is movable from a generally horizontal load-accumulating position, shown in solid lines in FIG. 1, to a generally vertical load-dispensing position, shown in dot-and-dash lines in FIG. 1. A hydraulic actuator 40, extending between load-carrying bed 20 and transfer bed 18, is employed to raise the transfer bed. When eight bales have been accumulated on bed 18, a tripping mechanism, not shown, directs fluid to actuator 40 which raises the bed to deposit the bales in a tier on load-carrying bed 20 (see FIG. 1).

Load-carrying bed 20, as shown in FIGS. 1 and 2, comprises a floor 44, a cross member 45 at the forward end of the bed, a cross member 48 at the rear end of the bed, a longitudinally movable rack 50, and a latch mechanism 51 for holding movable rack 50 in a desired position. Load-carrying bed 20 is pivotally mounted to brackets 53 on chassis 11, and the bed can be moved to a substantially vertical position for unloading by a hydraulic actuator 54. The forward end of bed 20 is supported on a stop 55 and is elevated above the rear end to facilitate rearward movement of the bale tiers and prevent them from toppling forward during the loading operation.

Movable rack 50 serves as a support means for the rear end of the load on bed 20. Rack 50 comprises a pair of tine arm units 56 joined by a transversely extending link member 60. The tine arm units 56 are mounted for movement on rails 61—61 attached to opposite sides of load-carrying bed 20, as shown in FIGS. 1 and 2. Each tine arm unit 56 comprises a vertical member 62 which carries spaced tines 64, and a triangular plate member 66 connected to link member 60. Triangular plate members 66 are provided with guide rollers 75 and 76 which operate in rails 61 on the load-carrying bed 20.

A mechanism 80 at the rear end of bed 20 is provided to rotate tine arm units 56 when the disclosed bale wagon is used for a retrieving operation. Since the present invention is not concerned with this function of the disclosed wagon, no further explanation of this mechanism is considered necessary.

Latch mechanism 51, as shown in detail in FIGS. 3–5, is employed as a holding means to fixedly secure movable rack 50 in a series of positions on the load-carrying bed 20. The latch mechanism 51 comprises a pulley 86 rotatably mounted on bed 20. A latch member 87 is pivotally mounted on bed 20 adjacent pulley 86 and is biased in the direction of pulley 86 by a spring 88. A tab 89 on latch member 87 is adapted to contact a dog 90 on pulley 86 to prevent rotation thereof. A movable sheave 91 is connected to a pair of springs 92 through a mounting bracket 93. Springs 92 are connected at their rear ends to a mounting plate 94 on bed 20. A flexible connector, such as a cable or rope, 95 is connected at one end to cross member 45 at the forward end of the load-carrying bed. The connector extends from member 45 to movable sheave 91, then to pulley 86, and is fixed to link 60 in movable rack 50. It will be seen that springs 92 prevent the rack and the bale load from moving rearwardly too rapidly when the pulley is released. Also, the springs serve to return the rack 50 to the forward end of bed 20 when the bale load has been deposited on the ground.

A trip mechanism 100 is mounted on a transversely extending cross bar 101 which is fixed to upstanding end portions 32 of transfer bed structural elements 31. Trip mechanism 100 comprises a vertical element 103 which is fixed to bar 101, a pivotally mounted horizontally extending member 104 mounted on the upper end of element 103, and a spring 106 which maintains element 104 in a generally horizontal position and allows the element 104 to pass under latch arm 87 when the transfer bed is returning to the horizontal position.

In operation, bales B are loaded onto the receiving bed 16, one bale at a time. When two bales are received on the receiving bed, as shown in FIGS. 1 and 2, a tripping mechanism, not shown, causes the hydraulic actuator 24 to pivot the receiving bed upwardly and deposit the two bales on the transfer bed. When a layer of eight bales has been accumulated on transfer bed 18, the transfer bed is tilted to a vertical position and the tier of bales, four bales high, is placed on load-carrying bed 20. Each time a tier of bales is placed on the load-carrying bed, movable rack 50 must be indexed rearwardly one bale width.

With reference to FIGS. 3 to 5, it will be seen that when the transfer bed is moved to a vertical position, trip mechanism 100 will disengage the latch mechanism 51 and pulley 86 will rotate one revolution. The circumference of pulley 86 is equal to one bale width, and thus the rack is moved rearwardly by this amount. At the end of one revolution of pulley 86, the latch mechanism will again engage the pulley and prevent further rotation thereof. Movable rack 50 will be fixed in position, until the next tier is loaded.

From the foregoing description, it will be seen that the disclosed invention automatically holds the movable tine rack 50 in position when bales are being accumulated on the transfer bed and automatically permits rearward movement of the rack when a tier of bales is being placed on the load-carrying bed. The locking device regulates the distance between successive positions of the rack to one bale width. No adjustments of the locking device are necessary, regardless of the weight of bales being handled, since the device does not depend on spring action to hold the rack in place.

While this invention has been described with reference to a particular embodiment thereof, it will be understood that it is capable of modification, and this application is intended to cover any variations, uses, or adaptations, following in general, the principles of the invention and including such departures from the present disclosure as come within known or customary practice in the art to which the invention pertains, and as fall within the scope of the invention or the limits of the appended claims.

Having thus described my invention, what I claim is:

1. A bale wagon comprising:

a chassis structure;

bed means on said chassis structure, said bed means being adapted to receive successive tiers of bales at one end thereof;

support means mounted on said wagon for retaining bales in tier form on said bed means and adapted to move longitudinally of said bed means as additional tiers are placed thereon;

holding means operatively engageable with said support means for securing said support means in a fixed position relative to said bed means; and means for disengaging said holding means when a tier of bales is being placed on said bed means, said holding means comprising a pulley mounted on said bed means, a flexible connector extending from a fixed connection on said bed means around said pulley and connected to said support means, and a latch member mounted on said bed means adjacent said pulley and adapted to contact said pulley to prevent rotation thereof.

2. A bale wagon, as recited in claim 1, wherein said flexible connector extends around a movable sheave, said movable sheave is connected to a spring means fixed to a rear end of said bed means, and said spring means serves to bias said support means in a forward direction.

3. A bale wagon comprising:

a chassis structure;

bed means on said chassis structure, said bed means being adapted to receive successive tiers of bales at a forward end thereof;

means for loading successive tiers of bales on said bed means;

support means mounted on said wagon and adapted to move longitudinally adjacent said bed means, said support means being adapted to retain bales in tier form on said bed means and to move rearwardly as additional tiers are placed thereon;

locking means operatively engageable with said support means for normally locking said support means in a fixed position relative to said load-carrying bed; and means operable in response to movement of the loading means to disengage said locking means for incremental movement of the support means, said movement being in response to movement of the tiers of bales and substantially equal to one bale width.

4. A bale wagon comprising a wheel supported maneuverable chassis adapted to travel in a forward direction;

a receiving bed mounted on said chassis at a forward end thereof;

a transfer bed pivotally mounted adjacent said receiving bed and rearwardly thereof;

a load-carrying bed on said chassis rearwardly of said transfer bed, said load-carrying bed being adapted to receive successive tiers of bales at a forward end thereof;

vertically extending support means slidably supported over said load-carrying bed, said support means being adapted to retain bales in tier form on said load-carrying bed and to move rearwardly as additional tiers are placed thereon; and holding means operatively engageable with said support means for normally securing said support means in a fixed position relative to said load-carrying bed; and means operable in response to movement of said transfer bed to disengage said holding means for incremental movement of the support means, said movement being in response to movement of the tiers of bales and substantially equal to one bale width.

5. A bale wagon, as recited in claim 4, wherein said holding means comprises a pulley rotatably mounted on said load-carrying bed, a movable sheave is connected to a rear end of said load-carrying bed, a cable is fixed at one end to a forward end of said load-carrying bed, said cable extends around said movable sheave and said pulley and is connected to said support means, and a latch member is mounted on said load-carrying bed and is adapted to contact said pulley to prevent rotation thereof.

6. A bale wagon, as recited in claim 5, wherein said transfer bed is adapted to accumulate a layer of bales and place them on said load-carrying bed in a vertically extending tier, and said means for disengaging said holding means comprises a trip mechanism mounted on said transfer bed.

7. A bale wagon, as recited in claim 6, wherein said trip mechanism comprises a pivotally mounted element which is adapted to contact said latch member and move it out of contact with said pulley.

8. A farm implement comprising:

a first load-supporting means;

a second load-supporting means extending generally perpendicular to said first load-supporting means and movable adjacent thereto;

a holding mechanism for securing said second load-supporting means in an adjusted position relative to said first load-supporting means, said holding mechanism comprising a pulley rotatably mounted on said first means, a flexible connector extending around said pulley and fixed to said second means, said flexible connector exerting a driving force on said pulley when a force is directed against said second means, and means for selectively permitting rotation of said pulley when said force is applied, said last-named means comprising a dog on said pulley, a latch member pivotally mounted adjacent said pulley and having a tab adapted to contact said dog to prevent rotation of said pulley, and spring means biasing said tab into the path of said dog.

9. A farm implement, as recited in claim 8, wherein a trip mechanism is pivotally mounted adjacent said latch member, and said trip mechanism is adapted to momentarily move said latch member out of contact with said pulley whereby said pulley can make one revolution and said second means is permitted to move a distance equal to the circumference of said pulley.

References Cited

UNITED STATES PATENTS

| | | |
|---|---|---|
| 2,848,127 | 8/1958 | Grey. |
| 3,002,326 | 10/1961 | Carter et al. |
| 3,049,256 | 8/1962 | Urban _____ 214—518 |
| 3,220,586 | 11/1965 | Gollnick _____ 214—518 |
| 3,251,485 | 5/1966 | Fancher. |
| 3,272,352 | 9/1966 | Adams et al. |

GERALD M. FORLENZA, Primary Examiner

ROBERT J. SPAR, Assistant Examiner

U.S. Cl. X.R.

214—7